US008226050B2

(12) United States Patent
Ye et al.

(10) Patent No.: US 8,226,050 B2
(45) Date of Patent: Jul. 24, 2012

(54) CLAMPING DEVICE FOR HARD DISK DRIVE

(75) Inventors: Zhen-Xing Ye, Shenzhen (CN); Xian-Xiu Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/037,228

(22) Filed: Feb. 28, 2011

(65) Prior Publication Data
US 2012/0160979 A1 Jun. 28, 2012

(30) Foreign Application Priority Data

Dec. 24, 2010 (CN) .......................... 2010 1 0604410

(51) Int. Cl.
*G12B 9/00* (2006.01)
*H05K 5/00* (2006.01)
(52) U.S. Cl. ................ 248/27.3; 312/223.1; 361/679.33
(58) Field of Classification Search ................. 248/27.1, 248/27.3; 361/679.33, 679.34; 312/333, 312/223.1; 360/97.01
See application file for complete search history.

(56) References Cited

U.S. PATENT DOCUMENTS

| 6,275,377 | B1 * | 8/2001 | Liu et al. .................. 361/679.31 |
| 7,251,099 | B2 * | 7/2007 | Kao et al. ................. 361/679.33 |
| 7,515,407 | B2 * | 4/2009 | Goodman et al. ....... 361/679.34 |
| 7,575,203 | B2 * | 8/2009 | Lan et al. ..................... 248/27.1 |
| 7,580,253 | B1 * | 8/2009 | Chen et al. .............. 361/679.33 |
| 7,995,337 | B2 * | 8/2011 | Kuo ......................... 361/679.34 |
| 2006/0023413 | A1 * | 2/2006 | Lo et al. ........................ 361/684 |

* cited by examiner

*Primary Examiner* — Anita M King
(74) *Attorney, Agent, or Firm* — Altis Law Group, Inc.

(57) ABSTRACT

A clamping device for clamping a hard disk drive includes a supporting frame and a spacing member. The supporting frame includes a connection board, a fixing arm, and a spacing arm. The fixing arm and the spacing arm extend from opposite ends of the connection board in a direction away from the connection board. The connection plate, the fixing arm, and the spacing arm cooperatively define a receiving space for receiving the hard disk drive. The spacing arm includes an internal surface facing the receiving space and an external surface opposite to the internal surface. The spacing member includes two elastic elements. The spacing member is arranged on the external surface, with portions of the elastic elements protruding out of the external surface.

20 Claims, 6 Drawing Sheets

CLAMPING DEVICE FOR HARD DISK DRIVE

BACKGROUND

1. Technical Field

The disclosure generally relates to clamping devices and, particularly, to a clamping device for clamping hard disk drives.

2. Description of Related Art

Hard disk drives (HDDs) are generally installed in a computer case. In use, various or several hard disk drives are arranged adjacent to one another and cooperate to provide high storage. Heat dissipating efficiency of the HDDs is affected by spacing between each two neighboring HDDs. When the spacing of each two neighboring HDDs is fairly narrow, heat dissipating efficiency of the HDDs is relatively high. Generally, if one HDD is overlapped with another in assembly, heat may accumulate in the limited space and thus it can be difficult to dissipate. As such, the HDDs may break down due to thermal-overload.

Therefore, what is needed, is a clamping device, which can protect the HDD from thermal-overload, thus overcoming the above shortcomings.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Embodiments of the present disclosure will now be described in detail below and with reference to the drawings.

Figure 1:
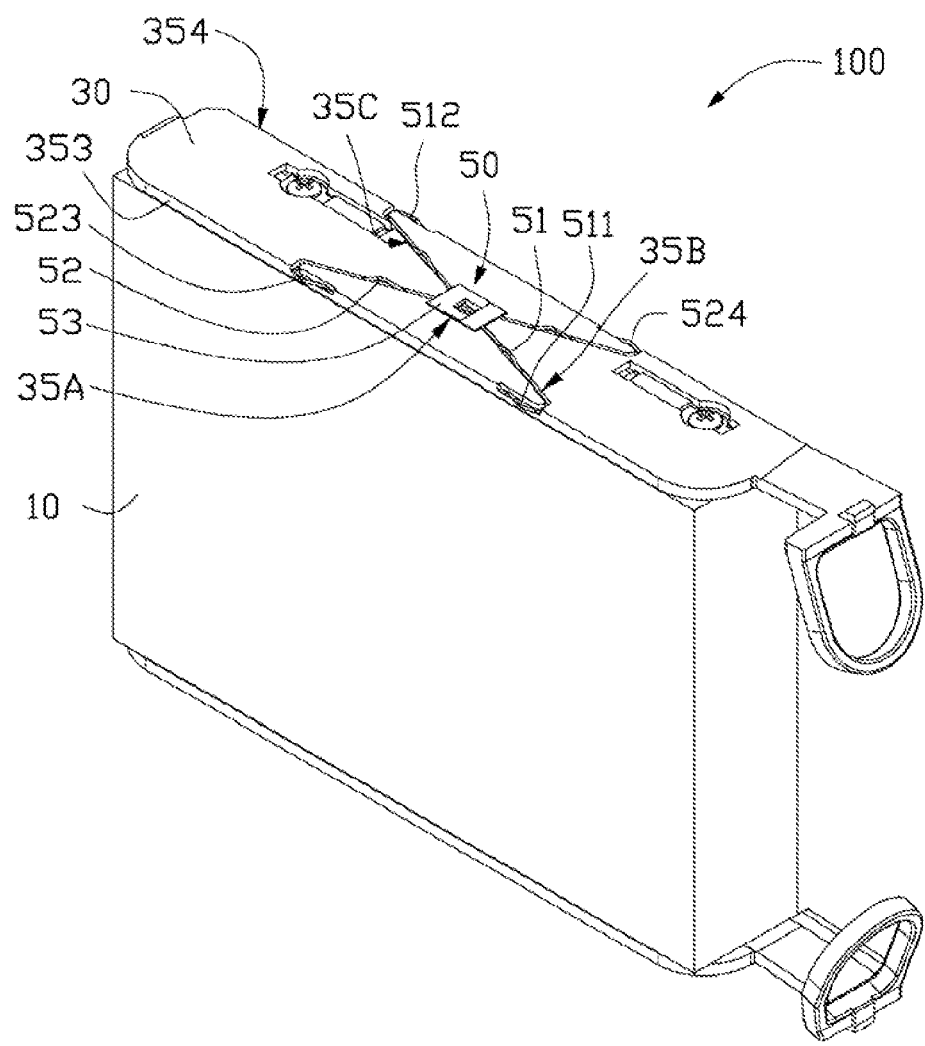
FIG. 1 is an isometric, assembled view of a clamping device in accordance with an embodiment, together with a hard disk drive.

Referring to FIG. 1, a clamping device 100 in accordance with an embodiment is shown. The clamping device 100, in this embodiment, is configured for clamping a hard disk drive (HDD) 10. The clamping device 100 includes a supporting frame 30 and a spacing member 50.

Figure 2:
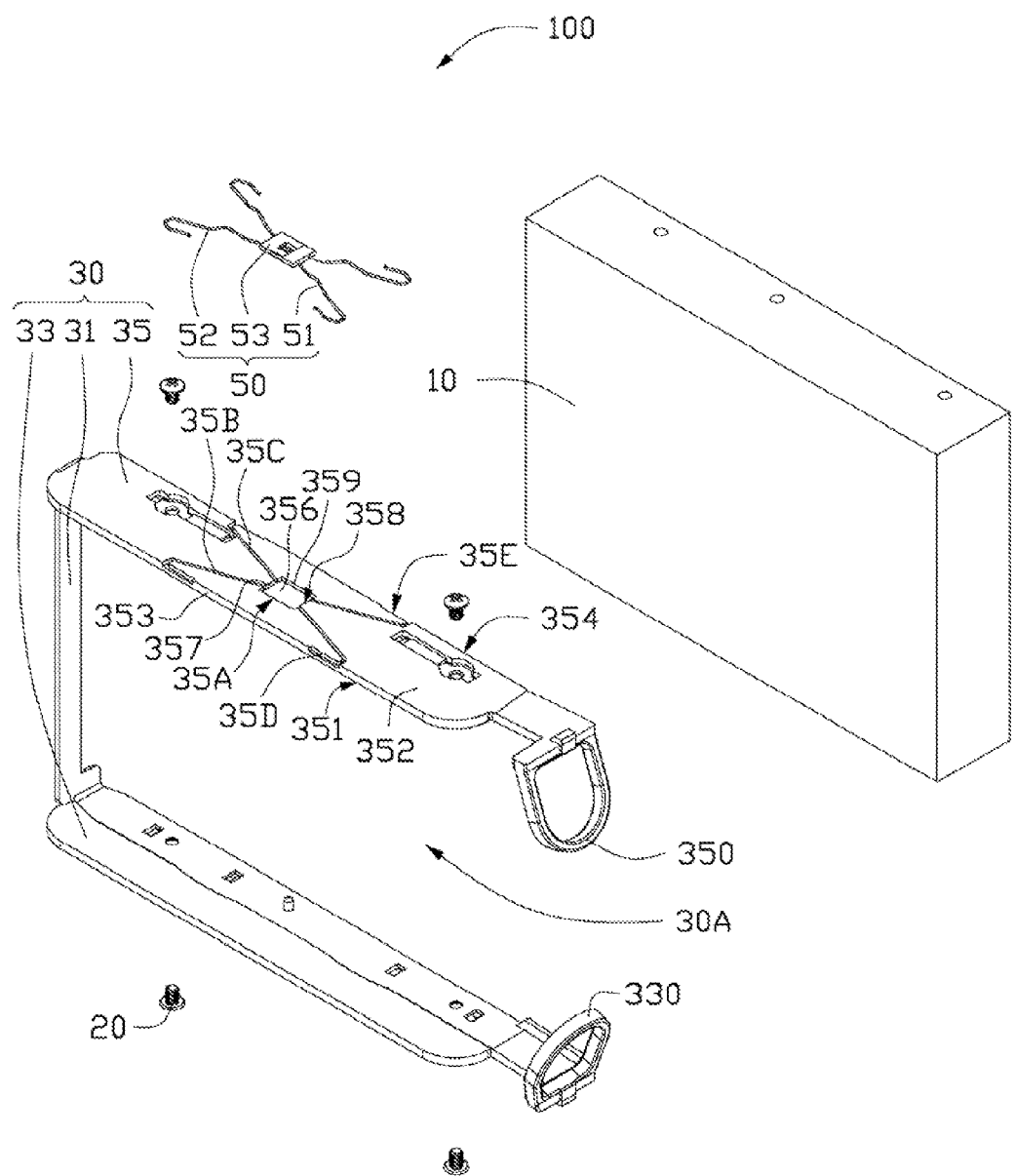
FIG. 2 is an isometric, exploded view of the clamping device of FIG. 1, the clamping device including a spacing member.

Referring further to FIG. 2, the supporting frame 30 includes a connection board 31, a fixing arm 33, and a spacing arm 35. The fixing arm 33 and the spacing arm 35 extend from opposite ends of the connection board 31 in a direction away from the connection board 31. The connection plate 31, the fixing arm 33, and the spacing arm 35 cooperatively define a receiving space 30A receiving the HDD 10. In assembly, the clamping device 100 can be used to clamp the HDD 10 in, a computer case, for example. Generally, the HDD 10 can be fixed to the supporting frame 30 by a number of fixing elements, such as screws 20 as shown in FIG. 2. In this embodiment, the fixing arm 33 includes a first operating section 330 distant from the connection plate 31. The spacing arm 35 includes a second operating section 350 distant from the connection plate 31. The first and the second operating sections 330 and 350 each are substantially circle-shaped, thus facilitating hands to operate.

The spacing arm 35 is elongated and plate-shaped. In this embodiment, the spacing arm 35 includes an internal surface 351, an external surface 352, a first side surface 353, and a second side surface 354. The internal surface 351 and the external surface 352 are located at opposite sides of the spacing arm 35. The internal surface 351 is exposed in the receiving space 30A. The external surface 352 is exposed to the exterior of the supporting frame 30. The first and the second side surfaces 353 and 354 each are located between and adjoin the internal surface 351 and the external surface 352. The internal surface 351 and the external surface 352 are substantially parallel to each other. The first and the second side surfaces 353 and 354 are substantially parallel to each other.

The spacing arm 35 has a first recess 35A, two second recesses 35B, and two third recesses 35C defined therein. The first recess 35A is defined in a central portion of the external surface 352. The two second recesses 35B are defined in an edge portion of the external surface 352 nearer to the first side surface 353 and further from the second side surface 354. The two third recesses 35C are defined in another edge portion of the external surface 352 nearer to the second side surface 354 and further from the first side surface 353. In this embodiment, the first recess 35A is substantially cuboid-shaped. The first recess 35A includes a bottom surface 356, a first lateral surface 357, a second lateral surface 358, and two third lateral surfaces 359 in the first recess 35A. The first and the second lateral surfaces 357 and 358 are oriented toward each other. The two third lateral surfaces 359 are oriented toward each other. In addition, each of the first, second, and third lateral surfaces 357, 358, and 359 adjoins and surrounds the bottom surface 356. In this embodiment, each of the first and the second lateral surfaces 357 and 358 are substantially perpendicular to the first side surface 353. Each of the two third lateral surfaces 359 are substantially parallel to the first side surface 353.

Each of the two second recesses 35B and the two third recesses 35C communicates with the first recess 35A. The two second recesses 35B extend toward and terminate at the first side surface 353. The two third recesses 35C extend toward and terminate at the second side surface 354.

In this embodiment, the spacing arm 35 has two fourth recesses 35D and two fifth recesses 35E defined therein. The two fourth recesses 35D are defined in the first side surface 353. The two fifth recesses 35D are defined in the second side surface 354. The two fourth recesses 35D are exposed at the first side surface 353 and the external surface 352, and communicate with the respective second recesses 35B. The two fifth recesses 35E are exposed at the second side surface 354 and the external surface 352, and communicate with the respective third recesses 35C.

Figure 3:
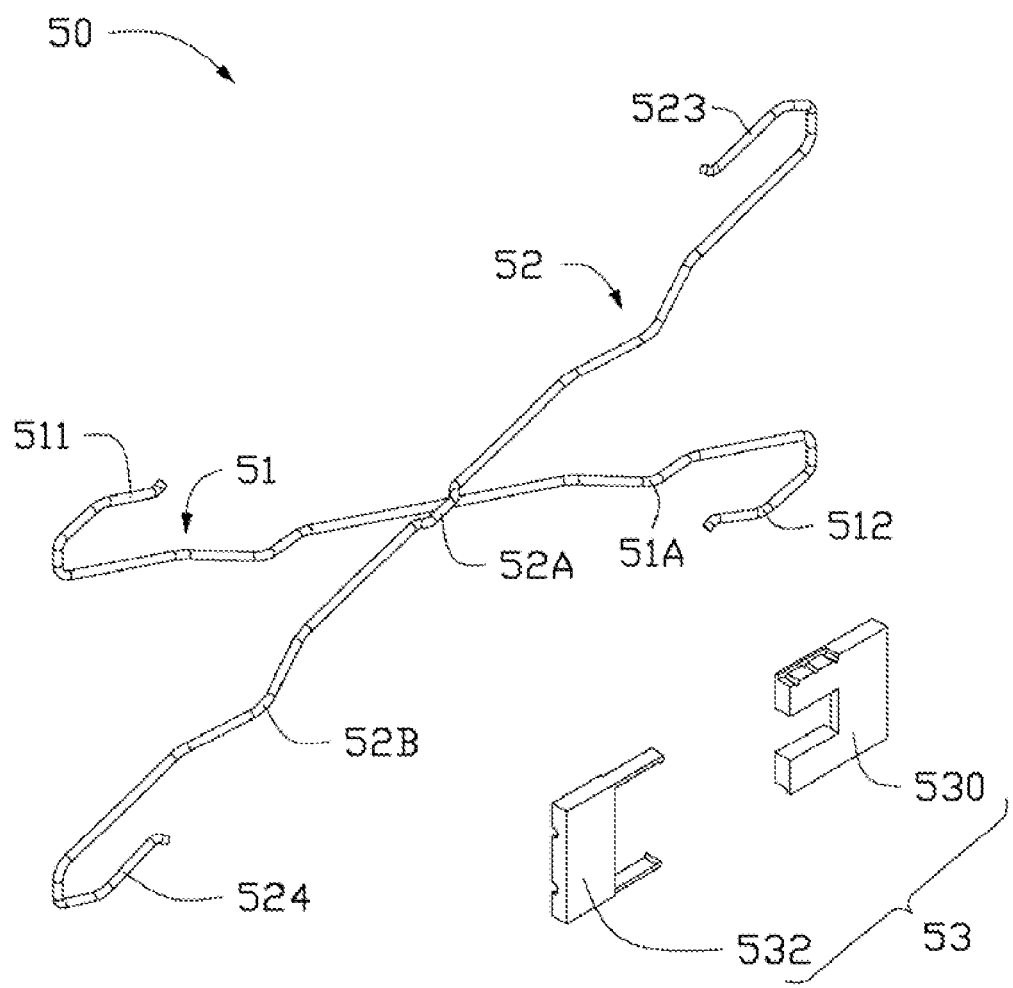
FIG. 3 is an isometric, exploded view of the spacing element, as seen from a front of the spacing element.
Figure 4:
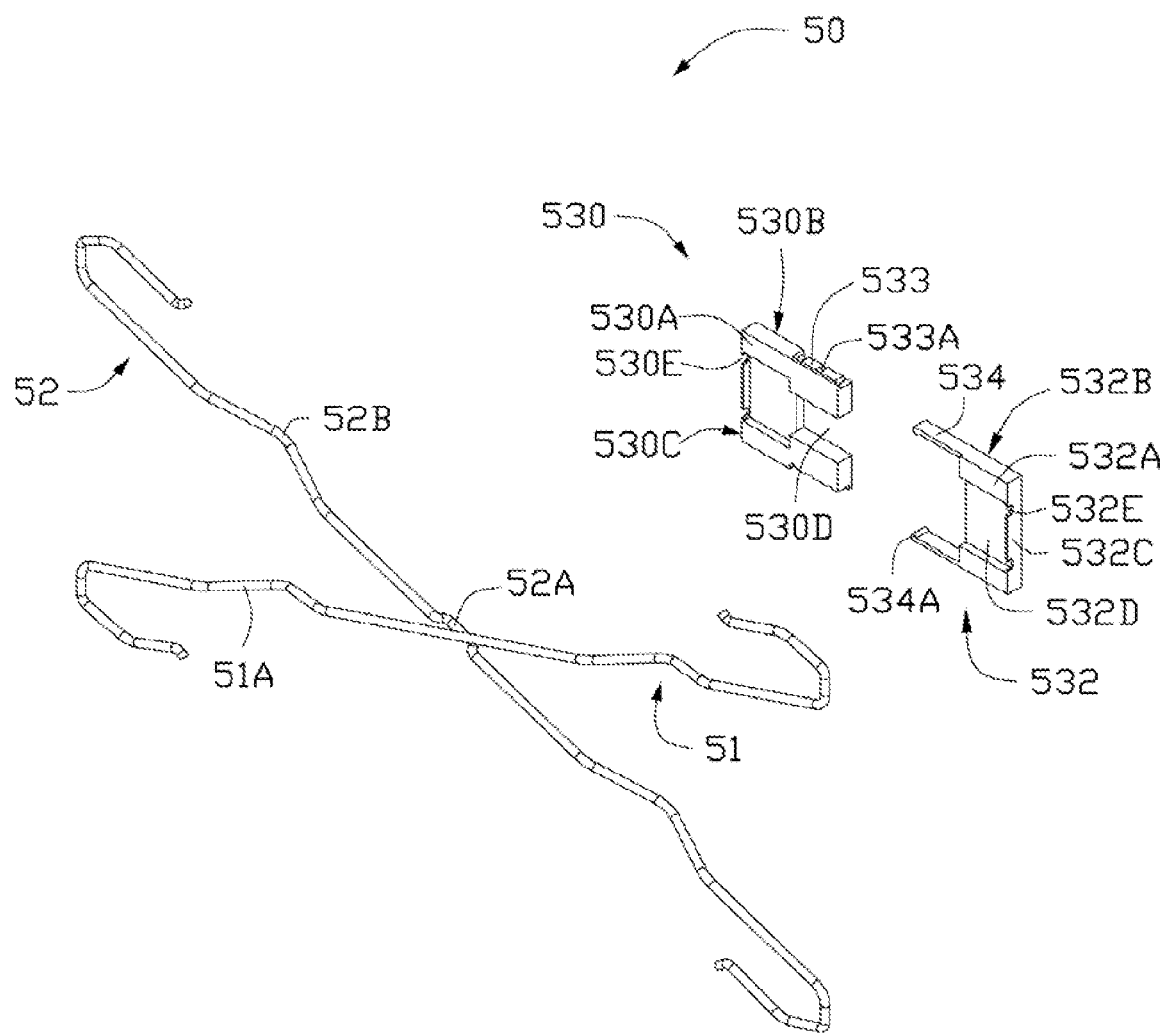
FIG. 4 is an isometric, exploded view of the spacing member, as seen from a rear of the spacing element.

Referring further to FIG. 3 and FIG. 4, the spacing member 50 includes a first elastic element 51, a second elastic element 52, and an engaging base 53. The first and the second elastic element 52 are made of flexible material, such as plastic. As shown in FIG. 3, the first elastic element 51 includes a first engaging end 511 and a second engaging end 512. The second elastic element 52 includes a third engaging end 523 and a fourth engaging end 524. A cross section of each of the first and the second elastic elements 51 and 52 is substantially circular.

The engaging base 53 includes a main body 530 and a connection block 532. The main body 530 includes a first surface 530A, a second surface 53013, a first peripheral surface 530C, a first groove 530D, and two first fixing holes 530E. The first and the second surfaces 530A and 530B are located at opposite sides of the main body 530. The first peripheral surface 530C is located between and adjoins the first and the second surfaces 530A and 530B. The first groove 530D is defined in the first surface 530A. In this embodiment, the first groove 530D is step-shaped. A portion of the first groove 530D nearer to the first peripheral surface 530C is wider than an opposite portion of the first groove 530D further from the first peripheral surface 530C. In addition, the portion of the first groove 530D further from the first peripheral surface 530C is exposed at the second surface 530B. The first fixing holes 530E are defined in the first peripheral surface 530C. Each of the first fixing holes 530E communicates with the first groove 530D. The connection block 532 includes a third surface 532A, a fourth surface 532B, a second peripheral surface 532C, a second groove 532D, and two second fixing holes 532E. The third and the fourth surfaces 532A and 532B are located at opposite sides of the connection block 532. The second peripheral surface 532C is located between and adjoins the third and the fourth surfaces 532A and 532B. The second groove 532D is defined in the third surface 532A. The second fixing holes 532E are defined in the second peripheral surface 532C. Each of the second fixing holes 532E communicates with the second groove 532D.

In this embodiment, the main body 530 has two rails 533, and a number of slots 533A defined in a surface of each rail 533. The slots 533A are arranged in sequence along a lengthwise direction of the rail 533. In addition, the connection block 532 includes two arms 534 in the side facing away from the second peripheral surface 532C. Each of the arms 534 has a protrusion 534A distant from the second peripheral surface 532C.

Figure 5:
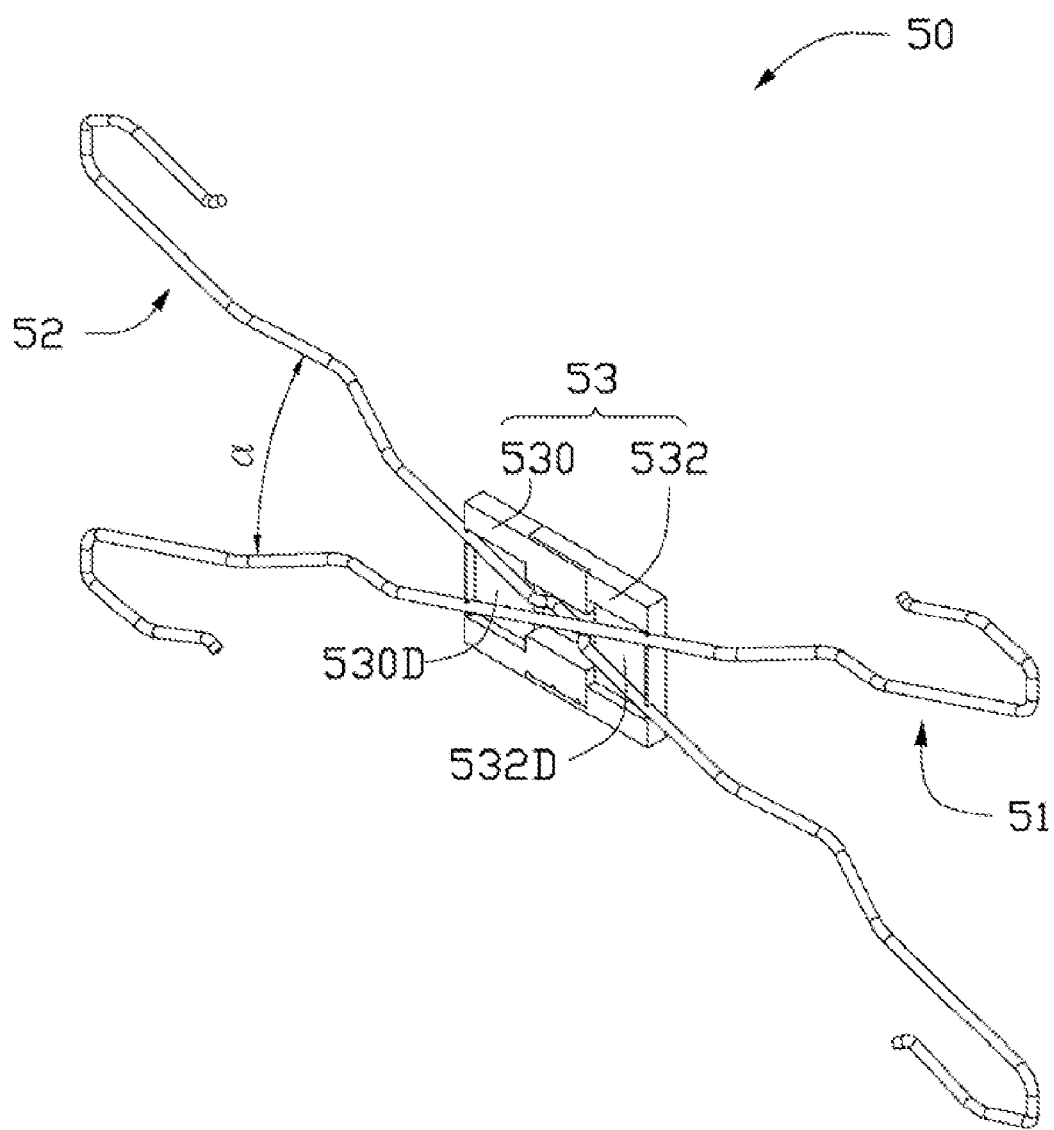
FIG. 5 is an isometric, assembled view of the spacing member, showing the spacing member in a first working state.

The connection block 532 is detachably attached to the main body 530. In this embodiment, the two arms 534 can be operated to slides along the respective rails 533, and the two protrusions 534A can be selectively and engagingly received in two respective slots 533A. As shown in FIG. 5, the spacing member 50 is operated in a first working state. The two protrusions 534A are engagingly received in two respective slots 533A nearest to the first peripheral surface 530C, such that the main body 530 and the connection block 532 cooperatively form a substantially cuboid-shaped engaging base 53.

The first elastic element 51 and the second elastic element 52 intersect with each other, and are attached to the engaging base 53. In this embodiment, the first elastic element 51 extends through one of the two first fixing holes 530E, the first groove 530D, the second groove 532D, and one of the two second fixing holes 532E in sequence. The second elastic element 52 extends through the other first fixing hole 530E, the first groove 530D, the second groove 532D, and the other second fixing hole 532E in sequence. The first groove 530D and the second groove 532D cooperatively receive an intersection of the first and the second elastic elements 51 and 52. To avoid interference occurring between the first and the second elastic elements 51 and 52, the second elastic element 52 includes a first bending portion 52A. The first bending portion 52A is a central and bent portion of the second elastic element 52, and configured for allowing the first elastic element 51 to extend below the first bending portion 52A (see FIG. 4). In this embodiment, the first bending portion 52A is exposed at the first groove 530D and protrudes from the second surface 530B. In addition, an angle α is defined between the intersection of the first and the second elastic elements 51 and 52, in a first working state as shown in FIG. 5. Furthermore, the second elastic element 52 includes two second bending portions 52B (see FIG. 3) at opposite ends thereof distant from the first bending portion 52A. In particular, one of the two second bending portions 52B is located between the third engaging end 523 and the first bending portion 52A, and the other second bending portion 52B is located between the fourth engaging end 524 and the first bending portion 52A. Moreover, the first elastic element 51 includes two third bending portions 51A at opposite side of the intersection. One of the two third bending portions 51A is located between the first engaging end 511 and the intersection, and the other third bending portion 51A is located between the second engaging end 512 and the intersection. Each of the two second bending portions 52B and the two third bending portions 51A protrudes from the external surface 352.

In this embodiment, the first and the second elastic elements 51 and 52 are shaped to conform to that of the corresponding first and the second fixing holes 530E and 532E. When the first and the second elastic elements 51 and 52 are attached to the engaging base 53, each of the first and the second elastic elements 51 and 52 abuts against inner surfaces of the first and the second fixing holes 530E and 532E.

The spacing member 50 is arranged on the external surface 352 of the spacing arm 35. In this embodiment, when the main body 530 and the connection block 532 cooperatively form the engaging base 53, the engaging base 53 can be fittingly received in the first recess 35A. The first surface 530A of the main body 530 and the third surface 532A of the connection block 532 are in contact with the bottom surface 356 in the first recess 35A. The first peripheral surface 530C of the main body 530 contacts the first lateral surface 357 in the first recess 35A. The second peripheral surface 532C of the connection block 532 contacts the second lateral surface 358 in the first recess 35A.

The first elastic element 51 extends through and received in one-of the two second recesses 35B, the first recess 35A, and one of the two third recesses 35C in sequence. The first engaging end 511 protrudes out from the first side surface 353, and the second engaging end 512 protrudes out from the second side surface 354. The second elastic element 52 extends through and is received in the other second recess 35B, the first recess 35A, and the other third recess 35C in sequence. The third engaging end 523 protrudes out from the first side surface 353, and the fourth engaging end 524 protrudes out from the second side surface 354. In this embodiment, each of the first, the second, the third, and the fourth engaging ends 511, 512, 523, and 524 are bent portions. The first and the third engaging ends 511 and 523 abut against bottoms of the corresponding fourth recesses 35D, and the third and the fourth engaging ends 512 and 524 abut against bottoms of the corresponding fifth recesses 35E. In alternative embodiment, the spacing arm 35 includes the first side surface 353 and the second side surface 354 but not necessary to have the fourth recesses 35D defined on the first side surface 353 and the fifth recesses 35E defined on the second side surface 354. In assembly, the first and the third engaging ends 511 and 523 can abut against the first side surface 353, and the second and the fourth engaging ends 512 and 524 can abut against the second side surface 354.

In use, a number of supporting frames 30 can be provided to arrange a number of HDDs 10 thereon respectively. As the first engaging end 511 and the third engaging end 523 protrude from the first side surface 353, the second engaging end 512 and the fourth engaging ends 524 protrude from the second side surface 354, the spacing member 50 can be used to space two neighboring HDDs 10. When the two neighboring HDDs 10 are spaced, a space is formed to facilitate the flowing of atmosphere therein, such that the heat from the HDDs 10 can be dissipated efficiently.

Figure 6:
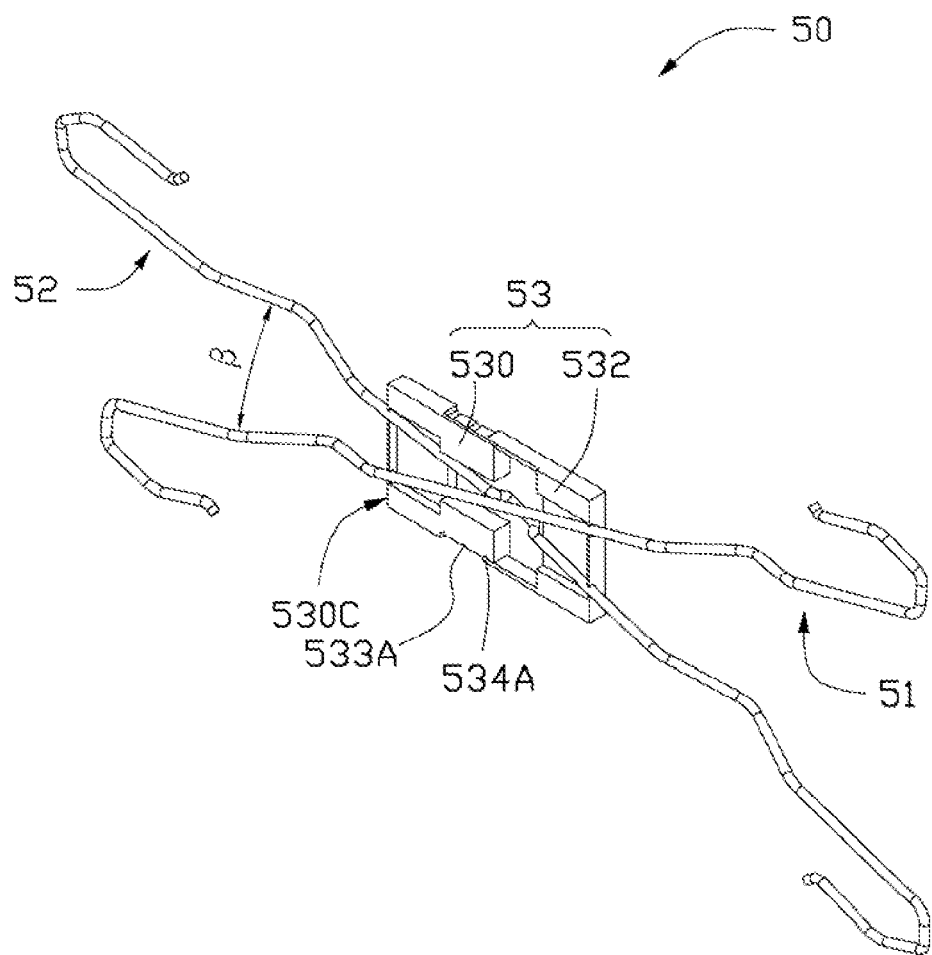
FIG. 6 is an isometric view of the spacing member of FIG. 5, showing the spacing element in a second working state.

In this embodiment, the two arms 534 can be operated to slide along the respective rails 533, and the two protrusions 534A can be engagingly received in two selected respective slots 533A, such that the main body 530 and the engaging connection block 532 cooperatively form an engaging base 53 in variable size. As such, the spacing member 50 can be used to space HDDs with variable thickness. As shown in FIG. 6, the spacing member 50 operates in a second working state, the two protrusions 534A are engagingly received in two slots 533A furthest from the first peripheral surface 530C. An angle β (see FIG. 6) between the intersecting first elastic element 51 and second elastic elements 52 in the second working state is less than the angle α between the intersecting first elastic element 51 and second elastic elements 52 in the first working state (see FIG. 5). The spacing member 50 of the second working state can be used to space two neighboring HDDs with a thickness less than that of the HDDs 10 shown in FIG. 1.

It is understood that the above-described embodiment is intended to illustrate rather than limit the disclosure. Variations may be made to the embodiment without departing from the spirit of the disclosure. Accordingly, it is appropriate that the appended claims be construed broadly and in a manner consistent with the scope of the disclosure.

What is claimed is:

1. A clamping device for clamping a hard disk drive, the clamping device comprising:
   a supporting frame comprising a connection board, a fixing arm, and a spacing arm, the fixing arm and the spacing arm extending from opposite ends of the connection board in a direction away from the connection board, the connection plate board, the fixing arm, and the spacing arm cooperatively defining a receiving space for receiving the hard disk drive, the spacing arm comprising an internal surface facing the receiving space, an external surface opposite to the internal surface, a first side surface located between and adjoining the internal surface and the external surface, and a second side surface opposite to the first side surface, located between and adjoining the internal surface and the external surface; and
   a spacing member comprising a first elastic element, the spacing member arranged on the external surface of the supporting frame, at least a portion of the first elastic element protruding out of the external surface, the first elastic element comprising a first engaging end protruding out of the first side surface and a second engaging end protruding out of the second side surface.

2. The clamping device of claim 1, wherein the spacing arm has a first recess, two second recesses, and two third recesses defined therein, each of the second recesses and the third recesses communicates with the first recess, and the second recesses extend to and terminate at the first side surface, the third recesses extend to and terminate at the second side surface; the first elastic element extends through and is substantially received in one of the two second recesses, the first recess, and one of the two third recesses in sequence; the spacing member further comprises
   a second elastic element, the second elastic element comprises a third engaging end and a fourth engaging end, and the second elastic element extends through and is substantially received in the other second recess, the first recess, and the other third recess in sequence, the third engaging end and the fourth engaging end protrude out of the respective first and second side surfaces.

3. The clamping device of claim 2, wherein a portion of the second elastic element protrude out of the external surface of the spacing arm.

4. The clamping device of claim 2, wherein the first elastic element and the second elastic element intersect with each other at the first recess, the first recess is cuboid-shaped and defined in an central portion of the external surface of the spacing arm, the spacing arm includes a bottom surface, a first lateral surface, a second lateral surface, and two third lateral surfaces in the first recess, the first, the second, and the third lateral surfaces each adjoin and surround the bottom surface, each of the third lateral surfaces is located between and adjoins the first and the second lateral surface, the first side surface is substantially parallel to the second side surface, each of the first and the second lateral surfaces is substantially perpendicular to the first side surface.

5. The clamping device of claim 4, wherein the spacing member comprises an engaging base received in the first recess, each of the first and the second elastic elements extends through the engaging base.

6. The clamping device of claim 5, wherein the engaging base comprises:
   a main body, the main body comprising a first surface contacting the bottom surface, a first peripheral surface contacting the first lateral surface, a first groove defined in the first surface, and two first fixing holes defined in the first peripheral surface communicating with the first groove; and
   a connection block, the connection block comprising a second surface contacting the bottom surface, a second peripheral surface contacting the second lateral surface, a second groove defined in the second surface, and two second fixing holes defined in the second peripheral surface communicating with the second groove, wherein the connection block is detachably attached to the main body, the first elastic element extends through and is received in one of the two first fixing holes, the first groove, the second groove, and one of the two second fixing holes in sequence, the second elastic element extends through and is received in the other first fixing hole, the first groove, the second groove, and the other second fixing hole in sequence.

7. The clamping device of claim 6, wherein a cross section of each of the first and the second elastic elements is substantially circular.

8. The clamping device of claim 7, wherein the main body comprises two rails and a plurality of slots defined in a surface of each rail, the connection block comprises two arms, each of the arms has a protrusion, the two arms are configured for being slidable along the respective rails, such that the two protrusions are selectively and engagingly received in two respective slots.

9. The clamping device of claim 8, wherein each of the rails extends between the first lateral surface and the second lateral surface.

10. The clamping device of claim 2, wherein each of the first and the second elastic elements is made of plastic.

11. A clamping device for clamping a hard disk drive, the clamping device comprising:
   a supporting frame comprising a connection board, a fixing arm, and a spacing arm, the fixing arm and the spacing arm extending from opposite ends of the connection board in a direction away from the connection board, the connection board, the fixing arm, and the spacing arm cooperatively defining a receiving space for receiving the hard disk drive, the spacing arm comprising an internal surface facing the receiving space, an external surface opposite to the internal surface, a first side surface located between and adjoining the internal surface and the external surface, and a second side surface opposite to the first side surface, located between and adjoining the internal surface and the external surface, the spacing arm defining a first recess, two second recesses, and two third recesses therein, each of the second recesses and the third recesses communicating with the first recess, and the second recesses extending to and being terminated at the first side surface, the third recesses extending to and being terminated at the second side surface; and a spacing member arranged on the external surface of the supporting frame, the spacing member comprising a first elastic element and a second elastic element, a portion of the first elastic element and a portion of the second elastic element both protruding out of the external surface of the spacing arm, the first elastic element comprising a first engaging end and a second engaging end, the first engaging end and the second engaging end protruding out of the respective first and second side surfaces, the first elastic element extending through and being received in one of the two second recesses, the first recess, and one of the two third recesses in sequence, the second elastic element comprising a third engaging end and a fourth engaging end, the third engaging end and the fourth engaging end protruding out of the respective first and second side surfaces, the second elastic element extending through and being received in the other second recess, the first recess, and the other third recess in sequence.

12. The clamping device of claim 11, wherein the first elastic element and the second elastic element intersect with each other at the first recess, the first recess is cuboid-shaped and defined in an central portion of the external surface of the spacing arm, the spacing arm includes a bottom surface, a first lateral surface, a second lateral surface, and two third lateral surfaces in the first recess, the first, the second, and the third lateral surfaces each adjoin and surround the bottom surface, each of the third lateral surfaces is located between and adjoins the first and the second lateral surface, the first side surface is substantially parallel to the second side surface, each of the first and the second lateral surfaces is substantially perpendicular to the first side surface.

13. The clamping device of claim 12, wherein the spacing member further comprises an engaging base received in the first recess, each of the first and the second elastic elements extends through the engaging base.

14. The clamping device of claim 13, wherein the engaging base comprises:
a main body, the main body comprising a first surface contacting the bottom surface, a first peripheral surface contacting the first lateral surface, a first groove defined in the first surface, and two first fixing holes defined in the first peripheral surface communicating with the first groove; and
a connection block, the connection block comprising a second surface contacting the bottom surface, a second peripheral surface contacting the second lateral surface, a second groove defined in the second surface, and two second fixing holes defined in the second peripheral surface communicating with the second groove, wherein the connection block is detachably attached to the main body, the first elastic element extends through and received in one of the two first fixing holes, the first groove, the second groove, and one of the two second fixing holes in sequence, the second elastic element extends through and received in the other first fixing hole, the first groove, the second groove, and the other second fixing hole in sequence.

15. The clamping device of claim 14, wherein the main body comprises two rails and a plurality of slots defined in a surface of each rail, each of the two rails extends between the first lateral surface and the second lateral surface, the connection block comprises two arms, each of the arms has a protrusion, the two arms are configured for being slidable along the respective rails, such that the two protrusions are selectively and engagingly received in two respective slots.

16. A clamping device for clamping a hard disk drive, the clamping device comprising:
a supporting frame comprising a connection board, a fixing arm, and a spacing arm, the fixing arm and the spacing arm extending from opposite ends of the connection board in a direction away from the connection board, the connection board, the fixing arm, and the spacing arm cooperatively defining a receiving space for receiving the hard disk drive, the spacing arm comprising an internal surface facing the receiving space, an external surface opposite to the internal surface, a first side surface located between and adjoining the internal surface and the external surface, and a second side surface opposite to the first side surface, located between and adjoining the internal surface and the external surface, the spacing arm defining a cavity in the external surface; and
a spacing member arranged on the external surface of the supporting frame, the spacing member comprising a first elastic element substantially received in the cavity, the first elastic element comprising a first engaging end, a second engaging end, and a first bending portion located between the first and second engaging ends, the first engaging end protruding out from the first side surface, the second engaging end protruding out from the second side surface, the first bending portion protruding out from the external surface.

17. The clamping device of claim 16, wherein the cavity comprising a first recess, a second recess, a third recess, a fourth recess, and a fifth recess communicating with each other, the first recess is defined in a central portion of the external surface, the second and fourth recesses are defined in an edge portion of the external surface, the third and fifth recesses are defined in another edge portion of the external surface, the second recess interconnects the first and the fourth recesses, the third recess interconnects the first and the fifth recesses, the fourth recess is exposed at the first side surface, the fifth recess is exposed at the second side surface, the first engaging end is substantially received in the fourth recess, the second engaging end is substantially received in the fifth recess.

18. The clamping device of claim 16, wherein the spacing member further comprises a second elastic element substantially received in the cavity, the first and the second elastic elements substantially intersect with each other, the second elastic element comprising a third engaging end, a fourth engaging end, and a second bending portion located between the third and fourth engaging ends, the third engaging end protruding out of the first side surface, the fourth engaging end protruding out of the second side surface, the second bending portion protruding out of the external surface; the cavity comprises a first recess, two second recesses, two third recesses, two fourth recesses, and two fifth recesses communicating with each other, the first recess is defined in a central portion of the external surface, the second and fourth recesses are defined in an edge portion of the external surface, the third and fifth recesses are defined in another edge portion of the external surface, the second recesses interconnect the first and the fourth recesses, the third recesses interconnect the first and the fifth recesses, the fourth recesses are exposed at the first side surface, the fifth recesses are exposed at the second side surface, the first and the third engaging ends are substantially received in the respective fourth recesses, the second and the fourth engaging ends are substantially received in the respective fifth recesses.

19. The clamping device of claim 18, wherein the spacing member further comprises an engaging base received in the first recess, each of the first and the second elastic elements extends through the engaging base.

20. The clamping device of claim 19, wherein the engaging base comprises a main body and a connection block slidably and detachably engaged with the main body, the main body defines two first fixing holes further from the connection block, the connection block defines two second fixing holes further from the main body, the first elastic element extends through one of the two first fixing holes and one of the two second fixing holes, the second elastic element extends through the other first fixing hole and the other second fixing hole.

* * * * *